2

3,775,468
OPTICALLY ACTIVE β-HALOGENOALKYL ISOCYANATES

Klaus-Dieter Kampe, Frankfurt am Main, Germany, assignor to Farbwerke Hoechst Aktiengesellschaft vormals Meister Lucius & Bruning, Frankfurt am Main, Germany
No Drawing. Continuation-in-part of abandoned application Ser. No. 873,654, Nov. 3, 1969. This application May 5, 1970, Ser. No. 34,887
Claims priority, application Germany, Nov. 7, 1968, P 18 07 494.7
Int. Cl. C07c 119/04
U.S. Cl. 260—487                3 Claims

ABSTRACT OF THE DISCLOSURE

Optically active β-halogenoalkyl isocyanates are obtained by re-arrangement of N-halogenoazetidinones-(2) effected by radical-forming catalysts in the presence of unsaturated compounds as co-catalysts. Due to their groups of different degrees of reactivity the products are useful intermediates for the synthesis of heterocyclic compounds. They are, furthermore, useful for splitting racemic mixtures.

---

This is a continuation-in-part of copending application Ser. No. 873,654, filed Nov. 3, 1969, now abandoned.

The present invention relates to novel optically active organic compounds characterized by bearing functional groups of a different degree of reactivity. More specifically, it relates to optically active β-halogenoalkyl isocyanates of the Formula I

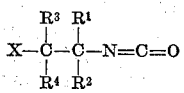

in which X is chlorine or bromine, $R^1$ and $R^2$ are hydrogen, lower alkyl, lower alkenyl, lower chloroalkyl, lower carboalkoxy-lower alkyl, lower carboalkoxy or phenyl and $R^3$ and $R^4$ are hydrogen or lower alkyl, with the proviso that at least $R^1$ and $R^2$ are different.

A further object of the invention is the preparation of said compounds by rearrangement of the corresponding N-halogeno-azetidinones-(2).

Copending U.S. patent application Ser. No. 727,347, filed May 7, 1968, now U.S. Patent 3,644,458, granted Feb. 22, 1972, corresponding to Belgian Patent No. 714,901, describes and claims a process for the preparation of β-halogenoalkyl isocyanates

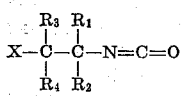

in which X is chlorine or bromine and $R_1$, $R_2$, $R_3$, and $R_4$ are hydrogen or an aliphatic, cycloaliphatic, araliphatic, aryl or heterocyclic radical having up to 18, preferably up to 13 carbon atoms, which may be substituted by groups which are inert towards isocyanate such as halogen atoms, carboalkoxy, cyano, nitro, alkoxy or aryloxy groups and in which two $R_1$, $R_2$, $R_3$ or $R_4$ groups taken together are lower alkylene, lower alkenylene or part of a polycyclic carbocyclic or heterocyclic ring system of up to 18 carbon atoms, which process comprises reacting a lactam of the formula

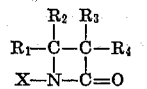

in which X, $R_1$, $R_2$, $R_3$, and $R_4$ have the meanings given above, in the presence of an alkene and/or an alkyne at a temperature of −30° to +250° C. with a radical-forming catalyst.

Further copending U.S. patent application Ser. No. 858,256 filed on Sept. 12, 1969, now U.S. 3,642,874 granted Feb. 15, 1972, I described and claimed α-carboalkoxy-β-halogeno-alkyl isocyanates of the formula

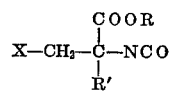

in which R is lower alkyl, R' is hydrogen or lower alkyl and X is chlorine or bromine, and a process for the preparation of said compounds by rearranging β-lactams of the formula

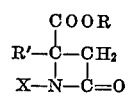

in which R, R', and X have the meanings given above under the conditions as described above.

It has now been found that optically active (β-halogeno-alkyl)-isocyanates of the general Formula I

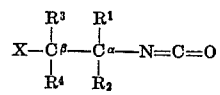

in which X is chlorine or bromine, $R^1$ and $R^2$ are hydrogen, lower alkyl, lower alkenyl, lower chloroalkyl, lower carboalkyoxy-lower alkyl, lower carboalkoxy or phenyl and $R^3$ and $R^4$ are hydrogen or lower alkyl, with the proviso that at least $R^1$ and $R^2$ are different, can be prepared by treating pure enantiomers of asymmetrical N-halogeno-2-azetidinones of the general Formula II

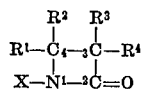

in which the radicals X, $R^1$, $R^2$, $R^3$, and $R^4$ have the meanings given above, with the proviso that at least $R^1$ and $R^2$ are different, with radical-forming catalysts, at temperatures in the range of from −30° to +250° C., preferably at between +10° and +150° C., in the presence of an olefinic compound and/or an acetylenic compound, if desired in the presence of a solvent which is inert toward the isocyanate group.

The more easily reacting bromine compounds are preferred (Formulae I and II: X=Br).

If the process of the invention is started using N-halogeno-β-lactams of the general Formula II, in which $R^3$ and $R^4$ are identical radicals, especially hydrogen atoms, and in which $R^1$ and $R^2$ are different radicals according to the condition mentioned above, thus, if the process is started from N-halogeno-β-lactams in which the carbon atom 4 is the center of asymmetry, there are obtained after the rearrangement reaction pure enantiomers of (β-halogeno-alkyl)-isocyanates. Hence, racemization at the carbon atom 4 of the β-lactam ring does not occur. If, however, N-halogeno-β-lactams are rearranged in which the carbon atom 4 as well as the carbon atom 3 are centers of asymmetry, total racemization takes place at the carbon atom 3. There are then obtained optically active (β-halogeno-alkyl)-isocyanates of the general Formula I which constitute in each case a 1:1 mixture of both diaestereomers, since the same configuration is present at the carbon atom standing in α-position to the isocyanate group as previously at the carbon atom 4 in the β-lactam.

The N-halogeno-β-lactams of the general Formula II (X=preferably bromine) serving as the starting substances are prepared according to the methods known for the N-halogenation or N-bromination of lactams (cf. e.g. B. Taub and J. B. Hino, J. Org. Chem. 25, 263 (1960); G. Caprara et al., Ann. Chimica 49, 1167

(1959)) by halogenation of the corresponding β-lactams with the equivalent amount of halogen in the presence of aqueous alkalis, preferably in the presence of sodium bicarbonate solution or of dilute soda solution. For the rearrangement reaction according to the invention, the unpurified N-halogen-β-lactams obtained after the halogenation may be used.

β-Lactams which it is advantageous to use in the process of the present invention are the N-bromine derivatives of pure enantiomers of 4-alkyl-, 4-alkenyl-, 4-aryl-, asymmetric 4,4-dialkyl-, 4-carbomethoxy- and 4-alkyl-4-carbomethoxy-azetidinones-(2). The aliphatic radicals of these derivatives may contain 1 to 4 carbon atoms and may be saturated or unsaturated and, optionally, substituted by a halogen atom. Examples of such β-lactams are the N-bromo-derivatives of 4-methyl-, 4-vinyl-, 4-phenyl-, 4-methyl-4-chloromethyl-, 4-methyl-4-propyl-, 4-methyl-4-vinyl-, 4-carbomethoxy- and 4-methyl-4-carbomethoxy-azetidinone-(2).

The acetidine-2-one-4-carboxylic acids are obtainable by oxidizing the corresponding 4-vinyl-azetidine-2-ones, e.g. with potassium permanganate. These acids are esterified according to methods known in the art, e.g. by means of diazoalkanes.

4-vinyl-azetidine-2-ones are obtainable by reacting the corresponding 1,3-dienes with N-carbonyl-sulfamic acid chloride, e.g. by proceeding as described in German Offenlegungschrift 1,445,789. Suitable 1,3-dienes are e.g. butadiene-1,3, isoprene, 2-ethyl-butadiene-(1,3) or 2-butyl-butadiene-(1,3) [cf. P. Goebel and K. Clauss, Liebigs Ann. Chem. 722, 122 (1969)].

Pure enantiomers of β-lactams are obtained by cyclization of the corresponding enantiomers of optically active β-amino-acid esters with Grignard compounds [E. Testa and co-workers, Liebigs Ann. Chem. 614, 158 (1958); R. W. Holley and A. D. Holley, J. Amer. Chem. Soc. 71, 2129 (1949)].

In principle all olefins and/or acetylenes may be used as cocatalysts which have one or several C—C double bonds and/or C—C triple bonds but no functional groups which would react with isocyanate groups. It is suitable to use olefins of a boiling point being at normal pressure below 150° C., preferably boiling from 25 to 150° C., having a simple structure and which are accessible without great technical expenditure, for example, ethylene, acetylene, propene, butene-(1), butene-(2), 4-methylpentane-(1), butadiene, isoprene, allyl chloride, allyl bromide, methallyl chloride, vinyl chloride, vinyl ethyl ether or vinyl acetate or mixtures of these olefins. Another reason for the suitability of these olefins is that it is possible to separate them easily from the isocyanates by fractional distillation—if desired together with a solvent—at relatively low temperatures, considerably below the boiling point of the isocyanates which have formed.

The olefins and/or acetylenes necessary for the process are suitably introduced in quantities of 0.02 to 3 moles per mole of N-bromo- or N-chloro-β-lactam of Formula II. If the process is carried out without solvents, it is suitable to add the required C—C-unsaturated compound in quantities of 0.3 to 3 moles per mole of N-bromo- or N-chloro-β-lactam. When carrying through the process in the presence of the solvents described above, the amount of solvents used per mole of N-bromo- or N-chloro-β-lactam is, in principle, not limited. It is suitable to use the solvents in quantities of 0.3 to 50 parts by weight per part by weight of the N-bromo- or N-chloro-β-lactam to be rearranged.

The process according to the invention for preparing β-halogenoalkyl-isocyanates may also be carried out simultaneously using the C—C-unsaturated component as solvent; in this case, this component is advantageously used in a quantity of 0.6–5.0 parts by weight per part by weight of N-halogeno-azetidinone-(2). Accordingly, there are preferably used unsaturated compounds having a boiling point below 170° C. under normal pressure. For this method of operation, olefins that polymerize rather slowly, for example allyl chloride, alkanes-(2) and cycloalkenes having a boiling point in the range of from 25 to 150° C., preferably from 35 to 70° C., and/or allyl esters of lower aliphatic carboxylic acids, for example allyl acetate, are suitable.

As radical-forming catalysts there may be used in the process of the present invention all compounds which decompose, while forming radicals, at temperatures in the range of from −30° C. to +250° C., preferably +10° to +150° C. Such radical formers preferred in the process of the present invention are, for example, organic peroxides and/or hydroperoxides, hydrogen peroxide, inorganic peroxide compounds and/or bisazo-iso-butyronitrile. Appropriate organic peroxides are, for example, di-tert.-butyl-peroxide, dibenzoylperoxide, dilauroyl-peroxide, diisopropyl-percarbonate, tert.-butyl-hydroperoxide, cumyl-hydroperoxide, pinane-hydroperoxide, tert.-butyl-perbenzoate and methyl-ethyl-ketone-peroxide.

The radical-forming catalysts used in the process of the present invention are advantageously used in quantities of 0.002 to 0.2 molar percent, referred to the N-bromo- or N-chloro-β-lactam quantity of Formula II.

It is of advantage to effect the rearrangement reaction of the N-bromo- or N-chloro-β-lactams in the presence of a solvent which is inert towards the isocyanate group. Especially suitable solvents are carbon tetrachloride, chloroform, methylene chloride, 1,2-dichloroethane, symmetric difluoro-tetrachloro-ethane, tetrachloro-ethylene and 1,4-dichloro-butane, or mixtures of these compounds. If the process of the invention is carried out in solution at temperatures above 100° C. it is advantageous to use as solvents hydrocarbons or ethers with a higher boiling point, for example dioxane or diglycol-dimethyl ether.

The preparation of the isocyanates of the present invention is extremely simple. The N-bromo-azetidinone-(2) or the N-chloro-azetidinone-(2) of Formula II is left for a period of about 30 minutes to several days at an appropriate reaction temperature, preferably between +10° and +150° C., in the presence of catalytic amounts of the radical donor and with the addition of an olefin and/or acetylene as cocatalyst, preferably in the presence of one of the solvents mentioned above. The reaction velocity of the rearrangement reaction with formation of the β-bromo- or β-chloro-alkyl-isocyanates of Formula I increases with the reaction temperature, with the amount of catalysts and with the concentration of the olefin or acetylene component. The velocity of the rearrangement of the different N-bromo- and N-chloro-β-lactams is different. In general, the N-chloro-β-lactams rearrange much more slowly than the corresponding N-bromo-compounds. But the degree of substitution of the β-lactam ring also influences the rearrangement velocity. When choosing the reaction temperature it is of advantage to consider the thermal stability of the N-bromo- or N-chloro-β-lactams. These compounds are more or less thermally sensitive; in general, the N-chloro-compounds are thermally more stable than the corresponding N-bromo-compounds. The thermal stability rises with an increasing degree of substitution of the N-bromo- or N-chloro-β-lactams.

Because of the aforementioned influences, the optimum conditions for the rearrangement of the present invention for the different N-bromo- and N-chloro-β-lactams of Formula II are very different; they are within a large range of temperature and require reaction times of different length.

After the rearrangement reaction, the solvent or solvents, if present, are suitably removed by distillation in vacuo and the reaction products are subjected to a fractional vacuum distillation. In some cases different amounts of a solid by-products are obtained in the rearrangement reaction. In such cases the solvent, which may be present, is evaporated under normal or reduced pressure, the residue is digested with an ether which is liquid at room temperature and which has a low boiling point or with a C₅–C₇ hydrocarbon and the solution is filtered with suction from the solid substance. The isocyanates formed are then in solution and are obtained in pure form by fractional distillation.

It is of advantage to carry out the inventive rearrangement of the preferably-used N-bromo-β-lactams of the general Formula II at a relatively high radical concentration, which considerably reduces the reaction time. In this method of operation, it is suitable to use radical donors whose decomposition half-life periods in the temperature range of from 30 to 65° C. are between 4 hours and 20 minutes, for example bis-(2,4-dichlorobenzoyl)-peroxide and di-isopropyl-peroxy-dicarbonate. Further, in this method of operation, it is suitable to add the N-bromo-azetidinone-(2) to a solution consisting of the catalyst and an unsaturated component and, optionally, of a solvent at a temperature in the range of from 35 to 65° C. In this method, the exothermic rearrangement reaction proceeds within periods ranging between 10 minutes and 1½ hours, in easily controllable manner and with yields of up to 93% of the theory of isocyanate. The radical-forming catalysts are used in this advantageous method of operation in quantities of 0.1 to 1.5 mol-percent per mole of N-bromo-azetidinone-(2).

As isocyanates having an additional reactive modifiable group, the (β-halogeno-alkyl)-isocyanates which can be prepared according to the present invention are valuable intermediate products and can be used in very many fields. These substituted isocyanates can be very easily cyclized thermally in the form of the corresponding carbamic acid esters to pharmaceutically active oxazolidones-(2) according to the method used for the first time by E. Katchalski [J. org. Chem., 15, 1067 (1950)]. According to French Pat. No. 1,340,810 β-chloroalkyl isocyanates are reacted with β-amino-alkanols to form the corresponding ureas, which are cyclized to 2-amino-oxazolines which are adrenolytic agents, e.g. substances capable of diminishing the blood pressure. Similar oxazolines, known from U.S. Pat. No. 3,453,284 as agents depressing central nervous system activity, are prepared from 2-chloro- or bromoethyl isocyanate. In German Offenlegungsschrift No. 1,470,036 similar oxazolines are disclosed as stimulants of the central nervous system. Their use avoids the disadvantages of amphetamine and they show a strong anorectic activity. Analogously, according to U.S. Pat. No. 2,650,922, Example 16, β-chloroethyl isocyanate is reacted with n-propylamine and the so-obtained urea is subjected to ring-closure with cyanoacetic acid, yielding a mixture of pyrimidine-diones having diuretic activity.

In contradistinction to the known β-halogenoalkyl isocyanates, which are optically inactive, the compounds according to the present invention are pure enantiomers, having two notoriously reactive groups. Due to the reactive isocyanato group bound to a molecule having optical activity, the new isocyanates are capable of reacting with compounds having active hydrogen atoms, e.g. hydroxy compounds or primary or secondary amines. Moreover, due to the second reactive group, the β-halogeno alkyl moiety, they even can react with tertiary amines by forming salts. Thus, enantiomers of pharmaceutically active substances of the aforesaid types can be prepared, which enantiomers are often more effective than the racemates thereof.

It is known that optically active "adjuvants" are used for resolving racemic mixtures. Thus, racemic alcohols are esterified with a pure enantiomer of tartaric acid or racemates of acids are resolved with optically active nitrogen.

These known "adjuvants" show a variety of disadvantages: tartaric acid is very weak acid requiring for the esterification rather severe conditions which may cause deterioration of the substance. On the other hand, the pure enantiomers of brucine, strychnine and the like are very expensive and extremely toxic. The optically active isocyanates according to the present invention, however, react in known manner under very smooth conditions with hydroxy compounds to yield carbamates (urethanes) and with amines to yield ureas.

The following examples illustrate the invention:

EXAMPLE 1

(a) Preparation of (—)-N-bromo-4-methyl-azetidinone-(2)

160 g. of bromine are added dropwise, while stirring vigorously, at room temperature, within 1 hour, to a mixture of 85 g. (1 mol) of optically pure (R)(+)-4-methyl-azetidinone-(2), 126 g. (1.5 mol) of sodium bicarbonate, 500 ml. of methylene chloride and 300 ml. of water and the reaction mixture was further stirred for 1 hour at room temperature. The mixture was then filtered with suction, the filter residue was washed with a small amount of methylene chloride, the phases of the filtrate were separated and the aqueous phase was extracted twice by shaking with methylene chloride. The methylene chloride extracts were combined with the corresponding phase from the filtrate of the reaction mixture, dried over sodium sulfate, filtered off and evaporated under reduced pressure at a bath temperature of 38–40° C. As residue, there remained behind 160–170 g. of crude levorotatory N-bromo-4-methyl-azetidinone - (2)([$\alpha$]$_D^{25}$:(—) 46.7°± 0.5° (c.=1.57, methylene chloride)). This product was used without purification as starting material for the rearrangement reaction.

(b) Rearrangement of (—)-N-bromo-4-methyl-azetidinone-(2)

A mixture of 160–170 g. of crude (—)-N-bromo-4-methylazetidinone-(2), as that obtained by the bromination of one mol of β-lactam described under (a), 300 ml. of chloroform, 100 ml. of methylene chloride, 47 g. of allyl chloride and 100 mg. of dilauroyl peroxide (0.025 mol percent) was boiled for 15 hours under reflux, the temperature in the reaction mixture amounting to 57° C. Then, the low-boiling components of the reaction mixture are evaporated in a circulation evaporator at a bath temperature of 40° C. and a pressure of 20–30 mm. Hg. The remaining liquid residue was distilled at a pressure of 2–5 mm. Hg into a cooled receiver. The distillate was then redistilled over a packed column at a pressure of 14–20 torr. 131 g. (80% of the theory) of pure (R)(—)-(β-bromo-isopropyl)-isocyanate were obtained. Boiling point 57.8° C./14 mm. Hg; $n_D^{20}$: 1.4713; $\alpha_D^{23.5}$: (—) 35.05° (undiluted; 1 dm.); [$\alpha$]$_D^{25}$: (—) 20.2° (c.=10.09, carbon tetrachloride). The elementary composition and the molecular weight correspond with the values calculated for $C_4H_6BrNO$.

EXAMPLE 2

1 mol of 4-(S)(—)-methyl-azetidinone-(2) was converted as described in Example 1 under (a) into the N-bromo-derivative. A solution of about 160–170 g. of crude (+)-N-bromo-4-methyl-azetidinone - (2) (about 1 mol) in 100 ml. of chloroform was added dropwise, while stirring, within 20–30 minutes, to a mixture heated to 58–60° C. of 250 ml. of chloroform, 81.5 ml. (76.5 g., 1 mol) of allyl chloride and 2 ml. of a 44% solution of diisopropyl-peroxy-dicarbonate in carbon tetrachloride (0.56 mol percent). The low-boiling components of the reaction mixture were then evaporated in a circulation evaporator at a bath temperature of 40° C. The liquid residue was distilled and redistilled as described in Example 1. 134 g. (82% of the theory) of pure (S)(+)-(β-bromo-isopropyl) - isocyanate were obtained; [$\alpha$]$_D^{23}$: (+) 20.1° (c.=10.1, carbon tetrachloride).

EXAMPLE 3

1 mol of 4-(S)(—)-methyl-azetidinone - (2) were converted into the N-bromo-derivative as described in Example 1 under (a). A solution of 160–170 g. of crude (+)-

N-bromo-4-methyl-azetidinone - (2) in 100 ml. of allyl chloride was added dropwise, while stirring, within about 30 minutes, to a mixture of 200 ml. of allyl chloride and 2 ml. of a 44% solution of diisopropyl-peroxy-dicarbonate in carbon tetrachloride, which mixture was kept boiling under reflux. The whole was further kept boiling under reflux for 1 hour and the major part of the allyl chloride was then removed from the reaction mixture by distillation under normal pressure. The residue was distilled and redistilled as described in Example 1. 122 g. (74.5% of the theory) of pure (S)(+)-($\beta$-bromo-isopropyl)-isocyanate were obtained; $[\alpha]_D^{23}$: (+) 20.0° (c.=10, carbon tetrachloride).

EXAMPLE 4

0.5 mol of 4-(R)(+)-vinyl-azetidinone-(2) was converted with 0.5 mol of N-bromo-succinimide at 45° C. in 300 ml. of carbon tetrachloride into the (+)-N-bromo-4-vinyl-azetidinone-(2) ($[\alpha]_D^{23.5}$: (+)38.4°±0.3°

(c.=1.51, methylene chloride)). After separation from the succinimide, the carbon tetrachloride was evaporated under reduced pressure and the crude (+)-6-bromo-4-vinyl-azetidinone-(2) as obtained was used for the rearrangement reaction. A solution of about 90 to 92 g. (0.5 mol, referred to 4-vinyl-azetidinone-(2)) of crude (+)-N-bromo-4-vinyl-azetidinone-(2) in 50 ml. of methylene chloride was added dropwise, within 30 minutes, while stirring, at 41–43° C., to a mixture of 125 ml. of methylene chloride, 41 ml. (0.5 mol) of allyl chloride and 2 ml. of a 44% solution of diisopropyl-percarbonate in carbon tetrachloride (1.12 mol percent radical former). The whole was then boiled for 1½ hours under reflux, the low-boiling components of the reaction mixture were evaporated under reduced pressure at a temperature of the bath of 40° C. and the liquid residue was distilled under a pressure reduced to 1 mm. Hg. The distillate obtained was fractionated under reduced pressure in a 35 cm. long packed column. 64 g. (73% of the theory) of pure (S)(−)-4-bromo-3-isocyanato-butene-(1) were obtained: boiling point: 68° C./14 mm. Hg: $n_D^{20}$: 1.4919; $[\alpha]_D^{23}$: (−)47.0° (c.=1.582, in methylene chloride); $\alpha_D^{23}$ (−)73.1° (undiluted; 1 dm.).

EXAMPLE 5

0.5 mol of 4-(S)(−)-vinyl-azetidnone-(2) was converted as described in Example 4 into the N-bromo-derivative. A solution of 90–92 g. (0.5 mol, referred to 4-vinyl-azetidinone-(2)) of crude (−)-N-bromo-4-vinyl-azetodinone-(2) in 60 ml. of cyclohexene was added dropwise, within 30 minutes, while stirring, at 50–52° C., to a mixture of 140 ml. of cyclohexene and 1.5 ml. of a 44% solution of diisopropylperoxy-dicarbonate in carbon tetrachloride (0.84 mol percent radical former). The whole was stirred for 30 minutes at 50° C. and the major part of the cyclohexene was removed from the reaction mixture by distillation under 150–170 mm. Hg. The remaining liquid residue was distilled and redistilled as described in Example 4. 58.5 g. (66.5% of the theory) of pure R(+)-4-bromo-3-isocyanato-butene-(1) were obtained; $[\alpha]_D^{23}$: (+)46.8° (c.=1.611, in methylene chloride); boiling point and refractive index are the sames as of the other (−)-enantiomer and of the racemate. The elementary composition and the molecular weight correspond with the values calculated for $C_5H_6BrNO$.

EXAMPLE 6

99 g. (1 mol) of (+)-trans-3,4-dimethyl-azetidinone-(2) were converted as described in Example 1 under (a) into the N-bromo-derivative (,(−)-N-bromo-trans-3,4-dimethyl-azetidinone-(2): $[\alpha]_D^{23}$: 7.0±0.3° (c.=2.00, methylene chloride). A mixture of 173–17S g. of crude crystalline (−)-N-bromotrans-3,4-dimethyl-azetidinone-(2), 300 ml. of chloroform, 100 ml. of methylene chloride, 100 ml. (68 g.=1 mol) of isoprene and 120 mg. of dilauroyl-peroxide was boiled for 15 hours under reflux. The low-boiling components of the reaction mixture were then evaporated in a circulation evaporator under reduced pressure. The liquid residue was first distilled under a pressure of 2 to 3 mm. Hg, the distillate was then redistilled in a water jet vacuum in a 35 cm. high packed column. 129 g. (71% of the theory) of optically active, pure 2-isocyanato-3-bromo-butane in form of a 1:1 mixture of the diastereomers having a rotation $[\alpha]_D^{25}$: (−) 2.71° (c.=1.478, methylene chloride), a boiling point of 75° C./22 mm. Hg, $n_D^{20}$: 1.4721, $\alpha_4^{25}$: 1.419, were obtained; the elementary composition and the molecular weight correspond with the values calculated for $C_5H_8BrNO$. The composition of the mixture of diastereomers was determined by gas-chromatographical analysis.

EXAMPLE 7

1 mol (99 g.) of (−)-trans-3,4-dimethyl-azetidinone-(2) was converted as described in Example 1 under (a) into the crystalline N-bromo-derivative. A solution of 173–176 g. of (+)-N-bromo-trans-3,4-dimethyl-azetidinone-(2) (1 mol, referred to 3,4 - dimethyl-azetidinone-(2)) in 100 ml. of chloroform was added dropwise, while stirring, within 30 minutes, to a mixture that had been heated to 65–68° C. of 200 ml. of chloroform, 150 ml. of 1,2-dichloroethane, 100 ml. of methallyl chloride and 5 g. of a 50% paste of bis-(2,4-dichlorobenzoyl)-peroxide in silicone oil (0.65 mol percent radical former). The whole was stirred for 2 hours at a temperature of the bath of 70° C. Working up of the reaction mixture and isolation of the pure optically active 2-isocyanato-3-bromo-butane was effected in the same manner as described in Example 6. 122 g. (69% of the theory) of pure optically active 2-isocyanato-3-bromo-butane in form of the dextrorotatory 1:1 mixture of diastereomers having an $[\alpha]_D^{25}$ of +2.68° (c.=1.481, methylene chloride) were obtained. The other physical data correspond with those measured with the corresponding isocyanate having the inverse configuration at the $\alpha$-carbon atom.

EXAMPLE 8

(a) Preparation of (−)-N-bromo-4(S)-carbomethoxy-azetidinone-(2)

A solution of 32 g. of bromine in 50 ml. of methylene chloride was introduced dropwise, at 0° C., while stirring, within 15 minutes, into a mixture of 26 g. (0.2 mol) of (−)4(S)-carbomethoxy-azetidinone-(2) (prepared from 0.2 mol of (−)4(S) - carboxy-azetidinone - (2), $[\alpha]_D^{22}$: −82.5° (c.=1.00, H$_2$O) and diazomethane), 60 ml. of methanol, 140 ml. of methylene chloride, 80 ml. of water and 26 g. of sodium-hydrogen carbonate. The phases were then separated and the aqueous phase was extracted several times with methylene chloride. After drying with sodium sulfate, the combined methylene chloride extracts were evaporated under reduced pressure, at last at 1–2 mm. Hg, and a bath temperature of 10–20° C. 40 g. of crystalline slightly yellow colored (−)-N-bromo - 4(S)-carbomethoxy-azetidinone - (2) ($[\alpha]_D^{23}$: −140° (c.=1.02, CH$_2$Cl$_2$)) remained behind. This product was used without purification for the rearrangement reaction.

(b) Rearrangement of the (−)-N-bromo-4(S)-carbomethoxy-azetidinone-(2)

A solution of 40 g. of crude crystalline (−)-N-bromo-4(S)-carbomethoxy-azetidinone-(2) prepared according to (a), in 30 ml. of methylene chloride was added dropwise, while stirring, within 10 minutes, into a mixture of 100 ml. of methylene chloride, 50 ml. (0.62 mol) of allyl chloride and 0.5 ml. of a 44% solution of diisopropyl-peroxy-dicarbonate in carbon tetrachloride (0.70 mol (percent), which mixture was kept boiling under reflux. The whole was further kept boiling under reflux for 30 minutes. The reaction mixture was then evaporated under reduced pressure in a circulation evaporator at a bath temperature of 38° C. The remaining oily residue was distilled under strongly reduced pressure and the distillate which passed over at 65 to 83° C. under 0.2 mm. Hg (33–35 g.) was redistilled in a high vacuum. Thereby, 29–30 g. (=70–72% of the theory) of pure (—)2(S)-isocyanato-3-bromopropanoic acid methyl ester were obtained; boiling point: 67° C./0.2 mm. Hg; $[\alpha]_D^{22}$: (—)16.0° (c.=1.68, $CH_2Cl_2$).

I claim:

1. An optically active compound of the formula

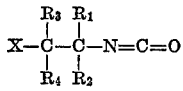

wherein X is chlorine or bromine, $R_1$ is lower carbalkoxy or lower carbalkoxy-lower alkyl, and $R_2$, $R_3$, and $R_4$ are each hydrogen or lower alkyl.

2. An optically active compound of the formula

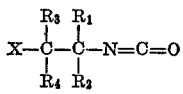

wherein X is chlorine or bromine, $R_1$ is lower carbalkoxy, $R_2$ is hydrogen or lower alkyl, and $R_3$ and $R_4$ are hydrogen or lower alkyl.

3. The enantiometrs of α-isocyanato-β-bromo-propionic acid methyl ester.

References Cited
UNITED STATES PATENTS 3,437,680   4/1969   Farrissery et al. _____ 260—453
2,768,154   10/1956  Unruh et al. _____ 260—453 X LEWIS GOTTS, Primary Examiner D. H. TORRENCE, Assistant Examiner U.S. Cl. X.R.

204—158; 260—239 A, 307 R, 453 AL, 453 AR, 453 P, 469, 471 C, 482 C, 999